US012559059B2

(12) United States Patent
Stone et al.

(10) Patent No.: US 12,559,059 B2
(45) Date of Patent: Feb. 24, 2026

(54) METHOD FOR IDENTIFYING AND MITIGATING DEPENDENT RISKS FROM IMPROPER SAFETY EQUIPMENT USE

(71) Applicant: GM Global Technology Operations LLC, Detroit, MI (US)

(72) Inventors: Noah Stone, West Bloomfield, MI (US); Matthew Edward Gilbert-Eyres, Rochester Hills, MI (US); Eric T. Hosey, Rochester Hills, MI (US); Robert Myers, Canton, MI (US); Russell A. Patenaude, Macomb Township, MI (US); Sean Taylor Coughlin, Shelby Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 45 days.

(21) Appl. No.: 18/527,847

(22) Filed: Dec. 4, 2023

(65) Prior Publication Data

US 2025/0178562 A1    Jun. 5, 2025

(51) Int. Cl.
B60R 22/48 (2006.01)
B60R 22/00 (2006.01)
G08B 21/02 (2006.01)

(52) U.S. Cl.
CPC .............. B60R 22/48 (2013.01); B60R 22/00 (2013.01); G08B 21/02 (2013.01); B60R 2022/485 (2013.01); B60R 2022/4866 (2013.01)

(58) Field of Classification Search
CPC .... G08B 21/00; G08B 21/02; G08B 21/0211; G08B 21/028; G08B 21/043; G08B 21/0492; G08B 25/016; G08G 1/0967; G08G 1/096708; G07C 5/00; G07C 5/008; G07C 5/0841; G07C 5/085; G01M 17/00; B60R 22/48; B60R 2022/485; B60R 2022/4866

See application file for complete search history.

(56) References Cited

U.S. PATENT DOCUMENTS

| | | | | |
|---|---|---|---|---|
| 2008/0319602 A1* | 12/2008 | McClellan | ............. | G07C 5/085 |
| | | | | 701/31.4 |
| 2014/0292503 A1* | 10/2014 | Schoenberg | ........... | G08B 21/18 |
| | | | | 340/438 |
| 2025/0118184 A1* | 4/2025 | Barcia | .................. | G06V 40/103 |

FOREIGN PATENT DOCUMENTS

| | | |
|---|---|---|
| DE | 102009061016 A1 | 3/2011 |
| DE | 102016207376 A1 | 11/2017 |
| DE | 102017009573 A1 | 4/2019 |
| DE | 102019132742 A1 | 6/2020 |
| DE | 102020106567 A1 | 12/2020 |

(Continued)

*Primary Examiner* — Van T Trieu
(74) *Attorney, Agent, or Firm* — Honigman LLP; Matthew H. Szalach; Jonathan P. O'Brien

(57) ABSTRACT

A safety equipment monitoring system for a vehicle includes a vehicle processor for storing vehicle data including one or more of vehicle event data, vehicle occupant data, and restraint system data. The safety equipment monitoring system also includes a server communicatively coupled with the vehicle processor and configured to determine a baseline desired location of a restraint based on the vehicle occupant data and the restraint system data. The server is also configured to determine if any deviations to the desired location of the restraint have occurred based on one or more of vehicle event data and the restraint system data.

20 Claims, 3 Drawing Sheets

(56) References Cited

FOREIGN PATENT DOCUMENTS

| | | | |
|----|----------------|----|---------|
| DE | 102022111037 | A1 | 2/2023 |
| DE | 102022127216 | A1 | 12/2023 |
| DE | 102023115451 | A1 | 5/2024 |

* cited by examiner

200   Vehicle Processor
202   Vehicle Data
204   Vehicle Event Data
206   Vehicle Passenger Data
208   Restraint System Data
210   Vehicle Location

300

500

100

10

METHOD FOR IDENTIFYING AND MITIGATING DEPENDENT RISKS FROM IMPROPER SAFETY EQUIPMENT USE

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates generally to a safety equipment monitoring system for a vehicle.

Restraint systems are important in vehicles as they protect vehicle occupants in the event of a vehicle crash. However, in order to be effective, restraint systems must be worn properly by a vehicle occupant for the entire length of the vehicle operation.

While some vehicles include restraint detection systems that may notify a vehicle occupant if a vehicle restraint is not secured, proper placement of the restraint system is also required for effectiveness. As such, a need remains for a system that can continually detect and notify a vehicle occupant of misplaced restraints to ensure the safety of all vehicle occupants.

SUMMARY

In one configuration, a safety equipment monitoring system for a vehicle includes a vehicle processor for storing vehicle data including one or more of vehicle event data, vehicle occupant data, and restraint system data. The safety equipment monitoring system also includes a server communicatively coupled with the vehicle processor and configured to determine a baseline desired location of a restraint based on the vehicle occupant data and the restraint system data. The server is also configured to determine if any deviations to the desired location of the restraint have occurred based on one or more of the vehicle event data and the restraint system data. Additionally, the server is also configured to notify a user of any determined deviations to the desired location of the restraint.

The safety equipment monitoring system may also include one or more of the following optional features. For example, the vehicle occupant data may include biometric information of a vehicle occupant including one or more of vehicle occupant height and vehicle occupant weight. Additionally, the restraint system data may include whether a child safety seat is installed. Moreover, the server may be further configured to determine whether a vehicle occupant is within safety limits of the installed child safety seat based on the vehicle occupant data and the restraint system data. Additionally, the vehicle data may be gathered using one or more of in-vehicle radar, cameras, latch sensors, and weight sensors. Further, a vehicle may incorporate the safety equipment monitoring system.

In another configuration, a safety equipment monitoring system for a vehicle includes a vehicle processor for storing vehicle data including one or more of vehicle event data, vehicle occupant data, and restraint system data and a server communicatively coupled with the vehicle processor. The vehicle server is configured to determine if deviations from a desired seat belt location have occurred based on one or more of the vehicle event data, the vehicle occupant data, and the restraint system data. The vehicle server is also configured to determine a level of response necessary based on one or more of the vehicle event data, the vehicle occupant data, and the restraint system data. The vehicle server is also configured to determine correction methods needed based on one or more of the vehicle occupant data and the restraint system data. Moreover, the vehicle server is configured to alert an occupant of the deviation from the desired seat belt location including a location of a detected deviation and the determined level of response necessary and suggest corrective actions based on the determined correction methods need.

The safety equipment monitoring system may also include one or more of the following optional features. For example, the server may be further configured to limit a speed of the vehicle if it is determined that urgent correction methods are needed. Additionally, the vehicle occupant data may include biometric information of a vehicle occupant including one or more of vehicle occupant height and vehicle occupant weight. Moreover, the restraint system data may include whether a child safety seat is installed. Additionally, the server may be further configured to determine whether a vehicle occupant is within safety limits of the installed child safety seat based on the vehicle occupant data and the restraint system data. Further, the vehicle data may be gathered using one or more of in-vehicle radar, cameras, latch sensors, and weight sensors. Additionally, a vehicle may incorporate the safety equipment monitoring system.

In another configuration, a safety equipment monitoring system for a vehicle includes a vehicle processor for storing vehicle data including one or more of vehicle location and restraint system data and a server communicatively coupled to the vehicle processor. The server is configured to determine if a child safety seat has been installed correctly based on the restraint system data. The server is also configured to suggest installation techniques to correct installation of the child safety seat based on the restraint system data and direct the vehicle to a nearest fire station or police station for further assistance based on the vehicle location if it is determined that the child safety seat has not been installed correctly.

The safety equipment monitoring system may also include one or more of the following optional features. For example, the vehicle processor may be configured to store data related to a serial number of the installed child safety seat and the server is configured to provide specific installation techniques based on the serial number of the installed child safety seat to correct installation of the child safety seat. Additionally, the vehicle processor may store vehicle occupant data including biometric information of a vehicle occupant including one or more of vehicle occupant height and vehicle occupant weight. Moreover, the server may be further configured to determine whether an occupant is within safety limits of the installed child safety seat based on the vehicle occupant data and the restraint system data. Additionally, the vehicle data may be gathered using one or more of in-vehicle radar, cameras, latch sensors, and weight sensors. Moreover, a vehicle may incorporate the safety equipment monitoring system.

BRIEF DESCRIPTION OF THE DRAWINGS

The drawings described herein are for illustrative purposes only of selected configurations and are not intended to limit the scope of the present disclosure.

Corresponding reference numerals indicate corresponding parts throughout the drawings.

DETAILED DESCRIPTION

Figure 1:
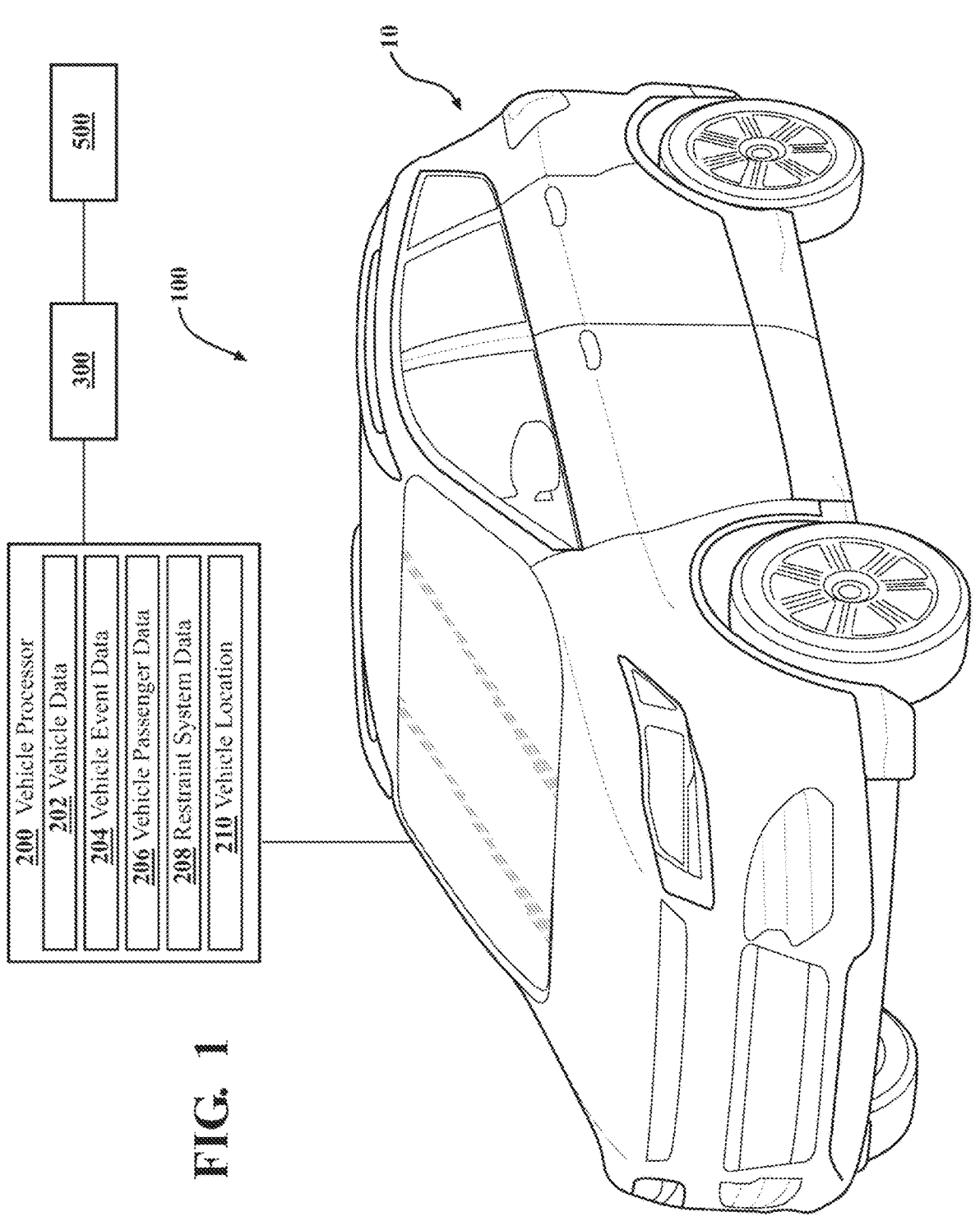
FIG. 1 is a front perspective view of a vehicle incorporating a safety equipment monitoring system according to the present disclosure.

Example configurations will now be described more fully with reference to the accompanying drawings. Example configurations are provided so that this disclosure will be thorough, and will fully convey the scope of the disclosure to those of ordinary skill in the art. Specific details are set forth such as examples of specific components, devices, and methods, to provide a thorough understanding of configurations of the present disclosure. It will be apparent to those of ordinary skill in the art that specific details need not be employed, that example configurations may be embodied in many different forms, and that the specific details and the example configurations should not be construed to limit the scope of the disclosure.

The terminology used herein is for the purpose of describing particular exemplary configurations only and is not intended to be limiting. As used herein, the singular articles "a," "an," and "the" may be intended to include the plural forms as well, unless the context clearly indicates otherwise. The terms "comprises," "comprising," "including," and "having," are inclusive and therefore specify the presence of features, steps, operations, elements, and/or components, but do not preclude the presence or addition of one or more other features, steps, operations, elements, components, and/or groups thereof. The method steps, processes, and operations described herein are not to be construed as necessarily requiring their performance in the particular order discussed or illustrated, unless specifically identified as an order of performance. Additional or alternative steps may be employed.

When an element or layer is referred to as being "on," "engaged to," "connected to," "attached to," or "coupled to" another element or layer, it may be directly on, engaged, connected, attached, or coupled to the other element or layer, or intervening elements or layers may be present. In contrast, when an element is referred to as being "directly on," "directly engaged to," "directly connected to," "directly attached to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The terms "first," "second," "third," etc. may be used herein to describe various elements, components, regions, layers and/or sections. These elements, components, regions, layers and/or sections should not be limited by these terms. These terms may be only used to distinguish one element, component, region, layer or section from another region, layer or section. Terms such as "first," "second," and other numerical terms do not imply a sequence or order unless clearly indicated by the context. Thus, a first element, component, region, layer or section discussed below could be termed a second element, component, region, layer or section without departing from the teachings of the example configurations.

In this application, including the definitions below, the term "module" may be replaced with the term "circuit." The term "module" may refer to, be part of, or include an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor (shared, dedicated, or group) that executes code; memory (shared, dedicated, or group) that stores code executed by a processor; other suitable hardware components that provide the described functionality; or a combination of some or all of the above, such as in a system-on-chip.

The term "code," as used above, may include software, firmware, and/or microcode, and may refer to programs, routines, functions, classes, and/or objects. The term "shared processor" encompasses a single processor that executes some or all code from multiple modules. The term "group processor" encompasses a processor that, in combination with additional processors, executes some or all code from one or more modules. The term "shared memory" encompasses a single memory that stores some or all code from multiple modules. The term "group memory" encompasses a memory that, in combination with additional memories, stores some or all code from one or more modules. The term "memory" may be a subset of the term "computer-readable medium." The term "computer-readable medium" does not encompass transitory electrical and electromagnetic signals propagating through a medium, and may therefore be considered tangible and non-transitory memory. Non-limiting examples of a non-transitory memory include a tangible computer readable medium including a nonvolatile memory, magnetic storage, and optical storage.

The apparatuses and methods described in this application may be partially or fully implemented by one or more computer programs executed by one or more processors. The computer programs include processor-executable instructions that are stored on at least one non-transitory tangible computer readable medium. The computer programs may also include and/or rely on stored data.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

The non-transitory memory may be physical devices used to store programs (e.g., sequences of instructions) or data (e.g., program state information) on a temporary or permanent basis for use by a computing device. The non-transitory memory may be volatile and/or non-volatile addressable semiconductor memory. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Various implementations of the systems and techniques described herein can be realized in digital electronic and/or optical circuitry, integrated circuitry, specially designed ASICS (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Referring to FIGS. 1-4, a safety equipment monitoring system 100 includes a vehicle processor 200 and a server 300 communicatively coupled to the vehicle processor 200. In FIG. 1, the safety equipment monitoring system 100 is incorporated into a vehicle 10. The vehicle 10 may be an electric vehicle 10 (EV) and may include autonomous or semi-autonomous capabilities. Alternatively, the vehicle 10 may include an internal combustion engine (ICE). Moreover, the vehicle 10 may be a hybrid vehicle 10 incorporating both EV and ICE components and capabilities.

Figure 2:
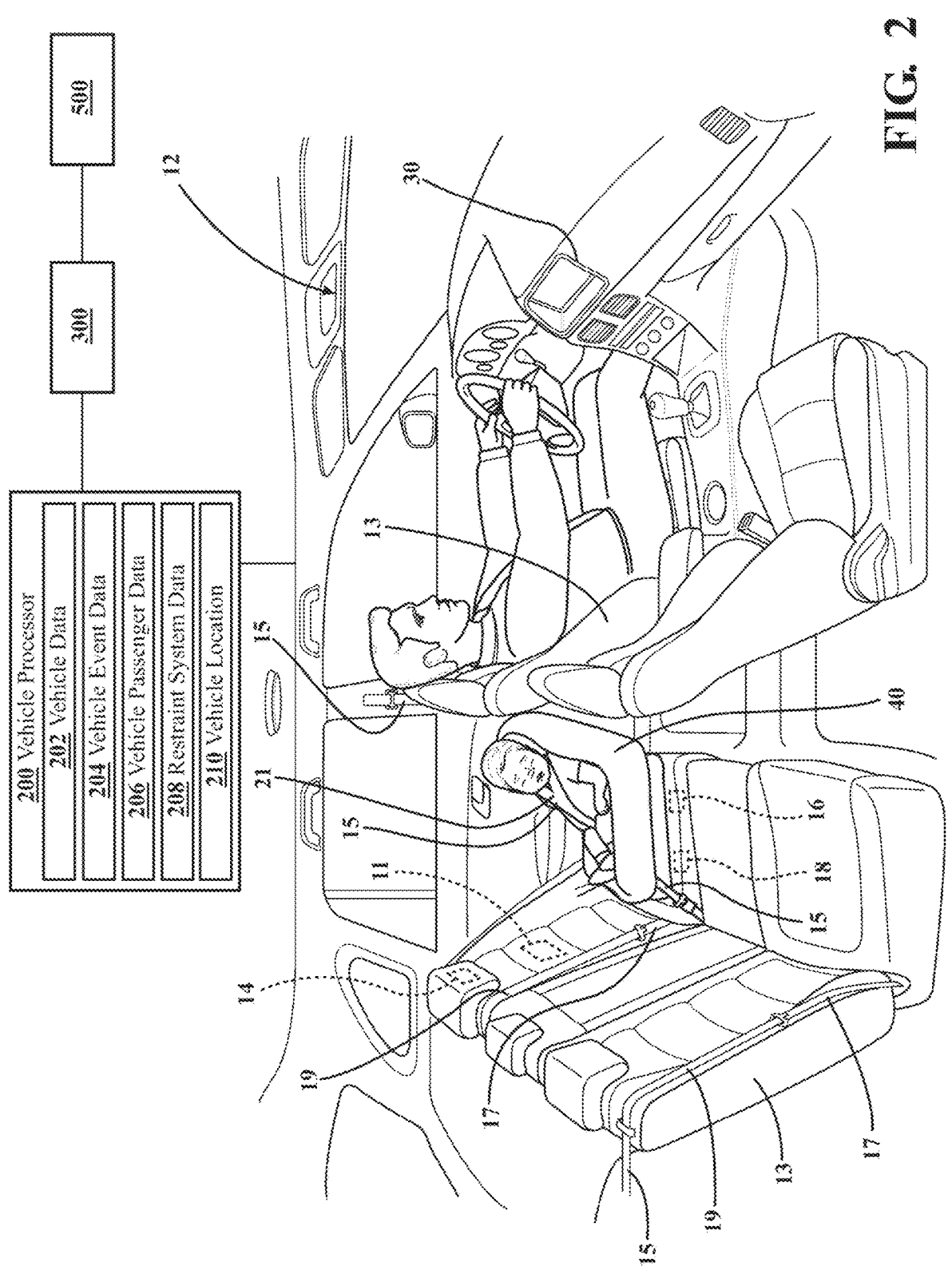
FIG. 2 is perspective view of an interior of the vehicle of FIG. 1 incorporating the safety equipment monitoring system according to the present disclosure.

Referring now to FIG. 2, the vehicle 10 includes a vehicle interior 12 including one or more vehicle seats 13. Each of the vehicle seats 13 may also include one or more restraints 15 configured to secure a vehicle occupant thereon. The restraint 15 may be a three-point restraint that includes a lap portion 17 and an upper-body portion 19, a two-point restraint that includes only the lap portion 17, or may be a five-point restraint including a harness 21. Regardless of the type of restraint (i.e., two-point, three-point, five-point, etc.), the restraint 15 is configured to move between a latched state and an unlatched state.

A child safety seat 40 may be installed on one or more of the vehicle seats 13. Many child safety seats 40 require two restraints 15 for operation. For example, a first restraint 15 is required to secure the child safety seat 40 to the vehicle seat 13. The first restraint 15 may be a three-point restraint of the vehicle seat 13 or may be a Lower Anchors and Tethers for Children (LATCH) coupling mechanism configured to secure the child safety seat 40 to the vehicle seat 13. Additionally, a second restraint 15 is required to secure the occupant of the child safety seat 40 to the child safety seat 40. The second restraint 15 may be a three-point restraint coupled to the vehicle seat 13, or may be a five-point restraint included in the child safety seat 40.

The vehicle interior 12 may include one or more of in-vehicle radar sensors 11, cameras 12, LATCH sensors 14, and weight sensors 16 to gather vehicle data 202. The vehicle data 202 includes one or more of vehicle event data 204, vehicle occupant data 206, restraint system data 208, and vehicle location 210. The vehicle event data 204 generally pertains to actions the vehicle 10 takes during operation. For example, vehicle event data 204 may include vehicle speed, vehicle steering wheel angle, vehicle crash, or other vehicle operations that may cause movement of the vehicle occupants and/or the restraints 15. The vehicle speed may pertain to the current speed of the vehicle 10, whether the vehicle 10 has stopped, whether the vehicle 10 has quickly changed speed, and other vehicle speed-related events. Moreover, vehicle steering wheel angle may pertain to the current angle of the steering wheel and whether the angle of the sterling wheel has quickly changed indicating a vehicle turn or swerve. Additionally, vehicle crash data includes whether the vehicle 10 has been in a crash or impact of any kind.

The vehicle occupant data 206 generally pertains to any data sensed or gathered related to the load of the occupant to be secured by the restraints 15. The vehicle occupant data 206 may include biometric information of an occupant including one or more of vehicle occupant height and vehicle occupant weight. Additionally, the vehicle occupant data 206 may include data for each occupant in the vehicle 10, including occupants of the child safety seat 40. Further the vehicle occupant data 206 may relate to items that may impact the safety of the occupants. For example, the vehicle occupant data 206 may include data related to bulky clothing items worn by the occupant, which may impact the restraint 15 or may include data related to loose items in the vehicle 10 that may move during vehicle operation and cause injury to the occupants.

The restraint system data 208 generally pertains to any data sensed or gathered related to the restraints 15 of the vehicle 10. The restraint system data 208 may include locations of the restraints 15 including locations with respect to portions of a vehicle occupant's body such that determination of correct placement is possible (i.e., whether the upper portion 19 is disposed over the occupant's shoulder), whether the restraint 15 is latched or unlatched, or whether the restraint 15 has the correct tightness to be effective. Additionally, the restraint system data 208 may include data for each restraint 15 corresponding to each vehicle seat 13 and/or restraints 15 related to the child safety seat 40 (i.e., the restraint securing the child safety seat 40 to the vehicle seat 13 and the restraint 15 securing the occupant to the child safety seat 40). Further, the restraint system data 208 may include data related to the specific child safety seat 40 installed in the vehicle 10 including, but not limited to, a serial number, expiration date of the child safety seat 40, dimensions, and/or configurations of the child safety seat 40. Additionally, the restraint system data 208 may include historical restraint system data 208, which includes data related to any past placements or configurations of the restraints 15.

The vehicle location 210 generally pertains to a location of the vehicle 10. More specifically, the vehicle location 210 generally pertains to the current location of the vehicle 10. The current vehicle location may be obtained from a Global Positioning System (GPS) or other navigation system, may be obtained from a user device such as a cellular phone or tablet, and/or may be obtained from a third-party processor 500 and communicated to the vehicle processor 200. Moreover, the vehicle location 210 may include route data such that a route the vehicle 10 is traveling may also be communicated to the vehicle processor 200. The route information may also include origin and destination information. The route information may be obtained from user input, a vehicle navigation system, past driver activity, or a third-party processor 500 and communicated to the vehicle processor 200.

With further reference to FIGS. 1-4, the server 300 is configured as a network and/or a cloud-based system that communicates with the vehicle processor 200. It is also contemplated that the vehicle processor 200 may communicate any or all of the vehicle data 202 to the server 300 for further processing and/or evaluation. Moreover, the vehicle processor 200 and/or the server 300 may continuously and/or regularly update such that the vehicle data 202 is updated in real time.

The server 300 may also be configured to communicate with third-party processors 500 to collect third-party data. For example, the third-party processors 500 may include, but are not limited to third-party databases such as databases including child safety seat information for the specific child safety seat 40 installed in the vehicle 10 such as installation instructions, height and/or weight requirements, expiration dates, troubleshooting advice, proper restraint placement, and/or recall information.

Referring still to the example shown in FIGS. 1-4, the server 300 is configured to determine a baseline desired location of the restraint 15 based on the vehicle occupant data 206 and the restraint system data 208. The desired baseline location may be the safest location for the vehicle occupant based on biometric data of the vehicle occupant and/or the safest configuration of the restraint 15. For example, the desired baseline location may include an optimal vehicle seat 13 for the occupant based on the occupant's height and weight. More specifically, the desired baseline location may include an indication that a certain occupant should be placed in a rear vehicle seat 13 based on their height and/or weight. Additionally, the desired baseline location may include an optimal location for each portion of the restraint 15. For example, the desired baseline location may include the upper portion 19 of the restraint extending over the occupant's shoulder.

Additionally, the server 300 is configured to determine if any deviations to the desired baseline location of the restraint 15 have occurred based on one or more of vehicle event data 204 and the restraint system data 208. More specifically, the server 300 may use data gathered from the vehicle sensors 11, 14, 16 and/or cameras 12 and compare the data to the desired baseline location to determine if any deviations have occurred. For example, the server 300 may use data collected from the vehicle camera 12 showing the upper portion 19 of the restraint is no longer extending over an occupant's shoulder, and is instead disposed behind the occupant to determine that a deviation from the desired baseline location has occurred. Moreover, the server 300 is also configured to notify the occupant of any determined deviations to the desired location of the restraint 15. The notification may be through words or images displayed on a vehicle dashboard 30, through an audio system, or other notifications.

Additionally, the server 300 is further configured to determine whether the occupant of the child safety seat 40 is within safety limits of the installed child safety seat 40 based on the vehicle occupant data 206 and the restraint system data 208. More specifically, the server 300 may use the vehicle occupant data 206, data gathered from the third-party processor 500 related to the specific child safety seat 40 that is installed, and restraint system data 208 including restraint 15 placement or adjustable configurations relating to the determination of whether the vehicle occupant is within the safety limits of the child safety seat 40. For example, the server 300 may use the height and weight of the occupant from the vehicle occupant data 206 along with third-party data related to the height and/or weight restrictions of the child safety seat 40 to determine if the occupant's height and weight are within the height and/or weight restrictions of the child safety seat 40.

Further, the server 300 is configured to determine if the child safety seat 40 has been installed correctly based on the restraint system data 208. Additionally, the server 300 may use data from the third-party processor 500 to check the installation of the specific child safety seat 40 based on the serial number. If the server 300 determines that the child safety seat 40 has not been installed correctly, the server 300 may be configured to suggest installation techniques to correct installation of the child safety seat 40 based on the restraint system data 208. The suggestions may be based on restraint system data 208 and/or third-party data. For example, the server 300 may suggest a certain installation or troubleshooting video that may assist in the correct installation of the child safety seat 40. Additionally, if the child safety seat 40 has still not been installed correctly after the suggestions, the server 300 may be configured to direct the vehicle 10 to the nearest fire station or police station for further assistance. For example, if the server 300 determines that the child safety seat 40 is installed uneven, the server 300 may recommend installation videos from the manufacturer that address how to level the child safety seat 40. If the child safety seat 40 is still uneven after the suggestions, the server 300 will use the vehicle location 210 to determine the closest fire or police station where further assistance can be given.

Once it has been determined that the child safety seat 40 has been installed correctly, the server 300 may be configured to provide periodic and/or constant checks to confirm the child safety seat 40 remains installed correctly. Additionally, as child safety seats 40 can often loosen over time, the server 300 may be configured to provide periodic reminders to the occupant to manually verify the correct installation of the child safety seat 40.

If it is determined that the location of the restraint 15 has moved from the desired baseline location, that the vehicle occupant is not within the safety limits of the installed child safety seat 40, and/or that the child safety seat 40 is installed incorrectly, the server 300 is configured to determine a requisite level of response. The level of response may be based on one or more of the vehicle event data 204, the vehicle occupant data 206, and the restraint system data 208. The level of response may include low urgency, medium urgency, or high urgency and may include corresponding levels of notification to the occupant. The levels of response may range from a simple notification to the occupant of the issue in a low urgency situation to placing a speed limit on the vehicle 10 such that the vehicle 10 may not travel above the set speed until corrective action is taken in a high-urgency situation. For example, if the server 300 determines that one or more of the restraints 15 of the child safety seat 40 are unlatched, the server 300 may determine that the level of response necessary is extremely urgent and may subsequently enforce a speed limit on the vehicle 10 until the issue is corrected.

Additionally, the server 300 may be configured to determine correction methods needed to the restraint 15 based on one or more of the vehicle occupant data 206 and the restraint system data 208. For example, if the server 300 determines that the restraint 15 has been unlatched from the child safety seat 40, the server 300 may determine that the corrective action of re-latching the restraint 15 of the child safety seat 40 is required. Additionally, the server 300 may be configured to suggest to the occupant that the determined corrective actions should be taken. For example, if re-latching of the child safety seat 40 is required, the server 300 may be configured to display on the vehicle dashboard 30 an image of the location and desired corrective action. Moreover, the display may be accompanied by an audio or other visual announcement of the desired corrective action.

In addition to the foregoing, the server 300 may be configured to determine if the child safety seat 40 should be replaced. For example, the server 300 may use the vehicle event data 204 to determine if a vehicle impact event occurred and may use the restraint system data 208 to determine if the impact forces affected the child safety seat 40. Additionally, if it is determined that the child safety seat

40 should be replaced, a notification may be consistently presented to the driver until the child safety seat 40 has been replaced.

Figure 3:
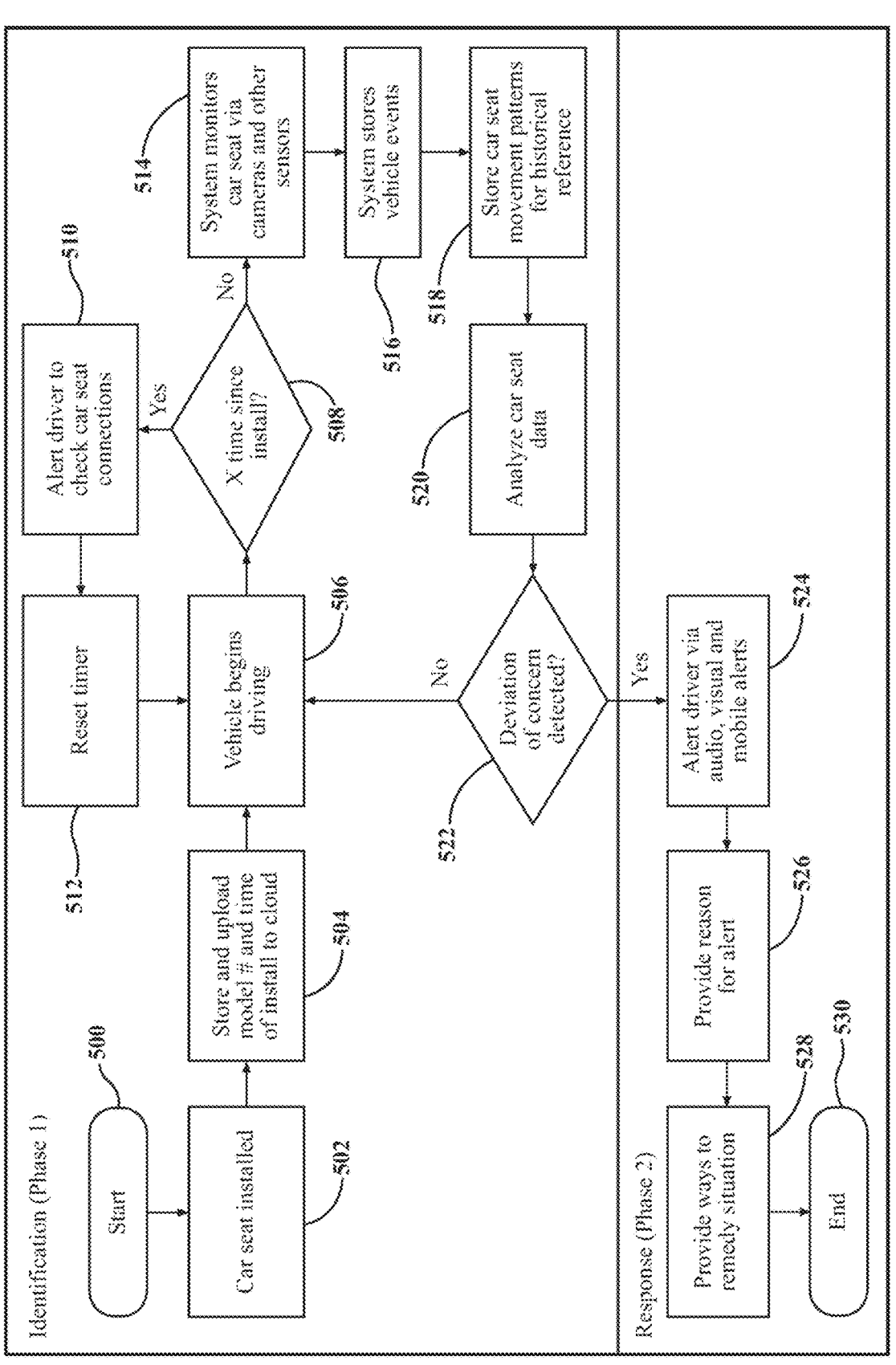
FIG. 3 is an exemplary process flow chart of the safety equipment monitoring system according to the present disclosure.

Referring now to the example shown in FIG. 3, in operation, the safety equipment monitoring system 100 starts at step 500 and a child safety seat 40 is installed at step 502. The vehicle processor 200 is then configured to store and upload the serial number or model number of the child safety seat 40 along with the date and time of install to the server 300 at step 504. The vehicle 10 begins driving at step 506 and the server 300 checks if a predetermined time has passed since the child safety seat 40 has been installed at step 508. If the predetermined time has passed, the server 300 will alert the occupant to check the installation of the child safety seat 40 to ensure it is still secure at step 510. Once the alert is complete, the server 300 will begin the timer on the predetermined time at step 512 and repeat the process. However, if the predetermined time has not passed, the system 100 monitors the child safety seat 40 using the vehicle cameras 14 and/or the sensors 11, 13, 16, at step 514 and stores vehicle data 202 at step 516. The system 100 also stores movement patterns of the child safety seat 40 for historical reference at step 518. The server 300 then analyzes the data at step 520. The analyzed data is used to determine if deviation from a desired position of the child safety seat 40 has occurred at step 522. If deviation has occurred, the server 300 alerts the occupant using one or more of audio, visual, and mobile alerts (i.e., an alert to a mobile device such as a cellular phone or tablet associated with one or more vehicle occupants) at step 524. The server 300 may then provide a reason for the alert at step 526 and provide suggestions to remedy the issue detected at step 528 before ending at step 530.

Restraint systems are important in vehicles as they protect vehicle occupants in the case of a vehicle impact event. However, in order to be effective, restraints must be worn properly by the vehicle occupant for the entire length of the vehicle operation. While some vehicles include restraint detection systems that may notify a vehicle occupant if a vehicle restraint is not secured, proper placement of the restraint is also required for effectiveness. As such, the safety equipment monitoring system 100 as described herein can continually detect and notify the vehicle occupant of misplaced restraints to ensure the safety of all vehicle occupants.

A number of implementations have been described. Nevertheless, it will be understood that various modifications may be made without departing from the spirit and scope of the disclosure. Accordingly, other implementations are within the scope of the following claims.

The foregoing description has been provided for purposes of illustration and description. It is not intended to be exhaustive or to limit the disclosure. Individual elements or features of a particular configuration are generally not limited to that particular configuration, but, where applicable, are interchangeable and can be used in a selected configuration, even if not specifically shown or described. The same may also be varied in many ways. Such variations are not to be regarded as a departure from the disclosure, and all such modifications are intended to be included within the scope of the disclosure.

What is claimed is:

1. A safety equipment monitoring system for a vehicle, the safety equipment monitoring system comprising:
   a vehicle processor for storing vehicle data including one or more of vehicle event data, vehicle occupant data, and restraint system data; and a server communicatively coupled with the vehicle processor and configured to:

determine a baseline desired location of a restraint based on the vehicle occupant data and the restraint system data, the baseline desired location of the restraint being dynamically generated and updated using at least one of: (i) body shape, posture, or anatomical landmarks of a vehicle occupant that are detected by in-vehicle sensors, (ii) historical restraint usage patterns for the specific vehicle occupant, and (iii) external data sources comprising manufacturer specifications or cloud-based safety databases associated with a unique identifier of the restraint;

determine if any deviations to the desired location of the restraint have occurred based on one or more of the vehicle event data and the restraint system data; and in response to detecting a deviation, automatically initiate a corrective action that includes adjusting a position of the restraint via an actuator.

2. The safety equipment monitoring system of claim 1, wherein the server is configured to notify a user of any determined deviations to the desired location of the restraint.

3. The safety equipment monitoring system of claim 1, wherein the vehicle occupant data includes biometric information of a vehicle occupant including one or more of vehicle occupant height and vehicle occupant weight.

4. The safety equipment monitoring system of claim 1, wherein the restraint system data includes whether a child safety seat is installed.

5. The safety equipment monitoring system of claim 4, wherein the server is further configured to determine whether a vehicle occupant is within safety limits of the installed child safety seat based on the vehicle occupant data and the restraint system data.

6. The safety equipment monitoring system of claim 1, wherein the vehicle data is gathered using one or more of in-vehicle radar, cameras, latch sensors, and weight sensors.

7. A vehicle incorporating the safety equipment monitoring system of claim 1.

8. A safety equipment monitoring system for a vehicle, the safety equipment monitoring system comprising:

a vehicle processor for storing vehicle data including one or more of vehicle event data, vehicle occupant data, and restraint system data; and a server communicatively coupled with the vehicle processor and configured to:

determine if deviations from a desired seat belt location have occurred based on one or more of the vehicle event data, the vehicle occupant data, and the restraint system data;

determine a level of response to the deviations from the desired seat belt location based on one or more of the vehicle event data, the vehicle occupant data, and the restraint system data;

determine correction methods needed based on one or more of the vehicle occupant data and the restraint system data;

alert a vehicle occupant of the deviation from the desired seat belt location including a location of a detected deviation and the determined level of response necessary; and suggest corrective actions based on the determined correction methods needed.

9. The safety equipment monitoring system of claim 8, wherein the server is further configured to limit a speed of the vehicle if it is determined that urgent correction methods are needed.

10. The safety equipment monitoring system of claim 8, wherein the vehicle occupant data includes biometric information of a vehicle occupant including one or more of vehicle occupant height and vehicle occupant weight.

11. The safety equipment monitoring system of claim 8, wherein the restraint system data includes whether a child safety seat is installed.

12. The safety equipment monitoring system of claim 11, wherein the server is further configured to determine whether a vehicle occupant is within safety limits of the installed child safety seat based on the vehicle occupant data and the restraint system data.

13. The safety equipment monitoring system of claim 8, wherein the vehicle data is gathered using one or more of in-vehicle radar, cameras, latch sensors, and weight sensors.

14. A vehicle incorporating the safety equipment monitoring system of claim 8.

15. A safety equipment monitoring system for a vehicle, the safety equipment monitoring system comprising:

a vehicle processor for storing vehicle data including one or more of vehicle location and restraint system data; and a server communicatively coupled to the vehicle processor and configured to:

determine if a child safety seat has been installed correctly based on restraint system data;

suggest installation techniques to correct installation of the child safety seat based on the restraint system data if the child safety seat has not been installed correctly; and direct the vehicle to a nearest fire station or police station for further assistance based on the vehicle location if it is determined that the child safety seat has not been installed correctly.

16. The safety equipment monitoring system of claim 15, wherein the vehicle processor is configured to store data related to a serial number of the installed child safety seat and the server is configured to provide specific installation techniques based on the serial number of the installed child safety seat to correct installation of the child safety seat.

17. The safety equipment monitoring system of claim 15, wherein the vehicle processor is configured to store vehicle occupant data including biometric information of a vehicle occupant including one or more of vehicle occupant height and vehicle occupant weight.

18. The safety equipment monitoring system of claim 17, wherein the server is further configured to determine whether a vehicle occupant is within safety limits of the installed child safety seat based on the vehicle occupant data and the restraint system data.

19. The safety equipment monitoring system of claim 15, wherein the vehicle data is gathered using one or more of in-vehicle radar, cameras, latch sensors, and weight sensors.

20. A vehicle incorporating the safety equipment monitoring system of claim 15.

* * * * *